United States Patent [19]
Maslak et al.

[11] Patent Number: 5,014,710
[45] Date of Patent: May 14, 1991

[54] STEERED LINEAR COLOR DOPPLER IMAGING

[75] Inventors: Samuel H. Maslak, Redwood City; Donald J. Burch, Los Altos; John N. Wright, Menlo Park; Hugh G. Larsen, Palo Alto; Donald R. Langdon, Mountain View; Joel S. Chaffin; D. Grant Fash, III, both of Saratoga, all of Calif.

[73] Assignee: Acuson Corporation, Mountain View, Calif.

[21] Appl. No.: 243,820

[22] Filed: Sep. 13, 1988

[51] Int. Cl.$^5$ ............................................... A61B 8/00
[52] U.S. Cl. .......................... 128/660.05; 128/661.09
[58] Field of Search ..................... 128/661.07–661.1, 128/660.05; 73/626, 861.25

[56] References Cited

U.S. PATENT DOCUMENTS

| 4,252,026 | 2/1981 | Robinson | 73/626 |
| 4,318,413 | 3/1982 | Iinuma et al. | 128/660.05 |
| 4,612,937 | 9/1986 | Miller | 128/660.05 |
| 4,742,830 | 5/1988 | Tamano et al. | 128/661.09 |
| 4,790,322 | 12/1988 | Iinuma | 73/861.25 X |
| 4,794,932 | 1/1989 | Baba | 128/661.09 |
| 4,817,619 | 4/1989 | Sugiyama et al. | 128/661.09 |

Primary Examiner—Francis Jaworski
Attorney, Agent, or Firm—James F. Mitchell

[57] ABSTRACT

A dual mode color Doppler imaging system using a linear array of transducer elements generates and transmits into an organism, such as the human body, an acoustic imaging beam optimized for B-mode imaging and a separate acoustic Doppler beam which is steered at preselected angles relative to the imaging beam and is optimized for Doppler data acquisition. Acoustic imaging echoes are acquired and displayed as a B-mode gray-scale image. Doppler data are acquired from multiple sample volumes along the direction of each Doppler beam. The Doppler information acquired along multiple lines is displayed as a color-encoded image that is spatially coordinated with, superimposed upon and simultaneously displayed with, the B-mode gray-scale image.

14 Claims, 2 Drawing Sheets

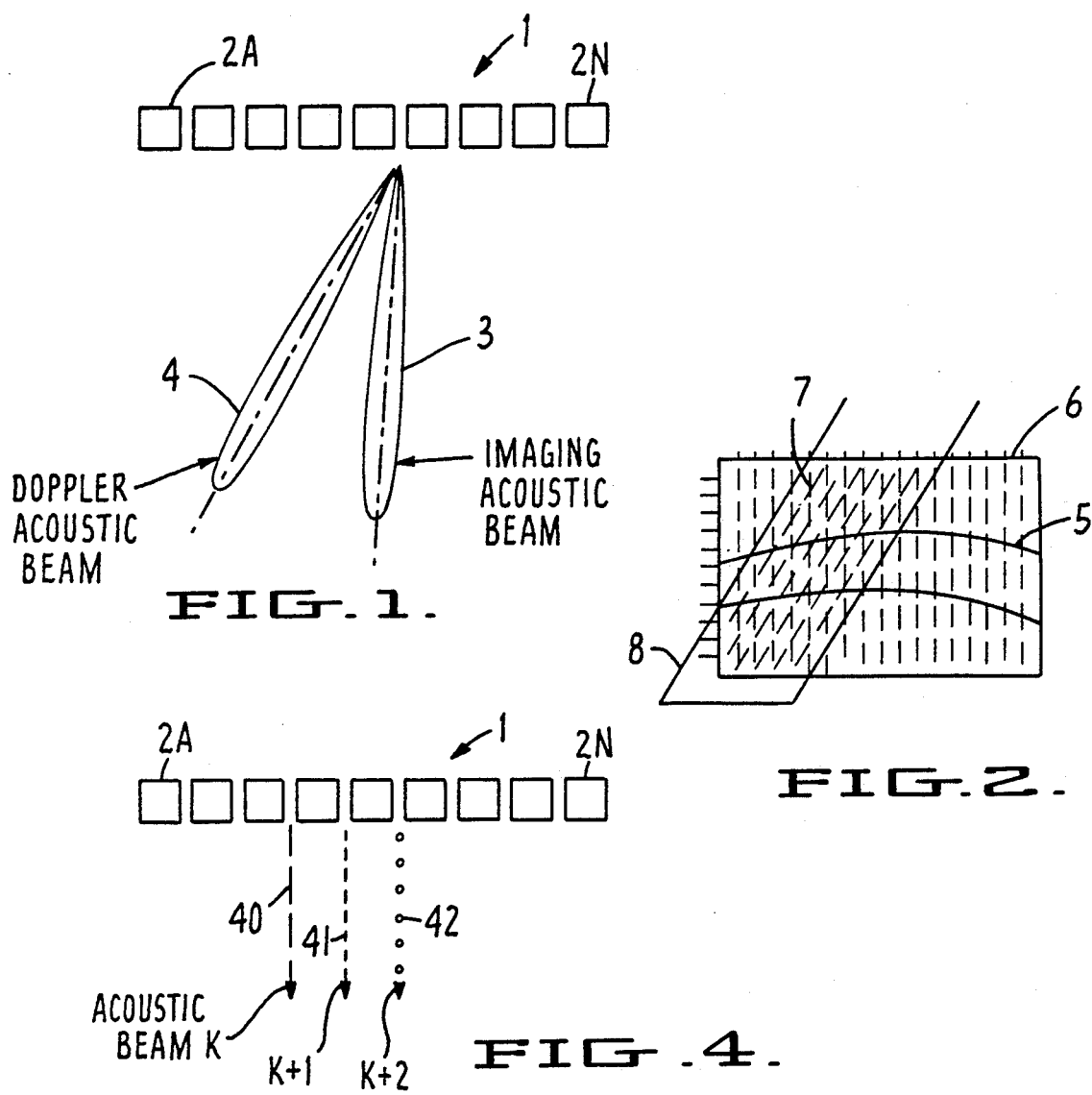

STEERED LINEAR COLOR DOPPLER IMAGING

BACKGROUND OF THE INVENTION

This invention relates to a dual mode ultrasound imaging system which generates and simultaneously displays a two-dimensional B-scan image of the organ or other portion of the human body being examined and a color Doppler image of blood flow information that is spatially coordinated with and superimposed upon that B-scan image.

In the prior art, B-mode images have been displayed along with separately displayed Doppler information acquired along a single line that may be oriented in a direction different from the scanning lines which generate the B-scan image. Prior art U.S. Pat. Nos. 4,182,173; 4,217,909; 4,398,540; 4,318,413 and 4,141,347 are examples. Sector scanned B-mode gray-scale image information and color-encoded Doppler data also have been simultaneously displayed where the Doppler information is acquired in multiple samples and multiple lines in the same direction as is the B-mode image information.

SUMMARY OF THE INVENTION

A principal object of the present invention is to provide color-encoded Doppler blood low velocity information in an image that is spatially coordinated with and superimposed upon a B-mode gray-scale image where the Doppler data is acquired by a linear transducer array with independent acoustic Doppler beams optimized for Doppler data acquisition and steered in directions that may be different from the B-mode acoustic image beam which is usually propagated perpendicularly to the linear array of transducer elements.

Another object of the invention is to acquire Doppler data on multiple steered parallel lines in an interleaved sequence and at multiple sample volumes along the direction of each of these lines without reducing frame rate.

The invention provides a linear array of transducer elements and means to generate and transmit an acoustic imaging beam with characteristics optimized for B-mode imaging in one direction into the organism under examination. Receive means process reflected acoustic imaging echoes into amplitude detected and digitally converted image information which is stored for subsequent video display of a gray-scale encoded B-mode "parallel scanned" image.

In addition, the linear array of transducer elements in timed sequence generates and transmits separate steered acoustic Doppler beams at angles and with characteristics optimized for Doppler data acquisition which may be different from both the characteristics and direction of the B-mode acoustic imaging beam. The Doppler-shifted echoes from multiple "sample volumes" along the direction of each Doppler beam are received and processed into blood flow information, typically velocity, variance and power. Selected blood flow information from multiple lines is then displayed as a color-encoded image that is superimposed on the B-mode image and is spatially coordinated and displayed simultaneously with it. Usually, velocity and variance in combination or velocity alone is the blood flow information selected for color-encoding and display simultaneously with the B-mode image.

BRIEF DESCRIPTION OF THE DRAWINGS

FIG. 1 illustrates a linear transducer array propagating an acoustic imaging beam and a separately steered and shaped acoustic Doppler beam;

FIG. 2 is a portion of the display which illustrates the dual mode image and scan line directions;

FIG. 4 is a schematic diagram of interleaved acquisition of color Doppler information on multiple acoustic lines; and FIG. 5 is a typical timing sequence for the multiple acoustic lines of FIG. 4.

DESCRIPTION OF THE PREFERRED EMBODIMENT

Figure 3:
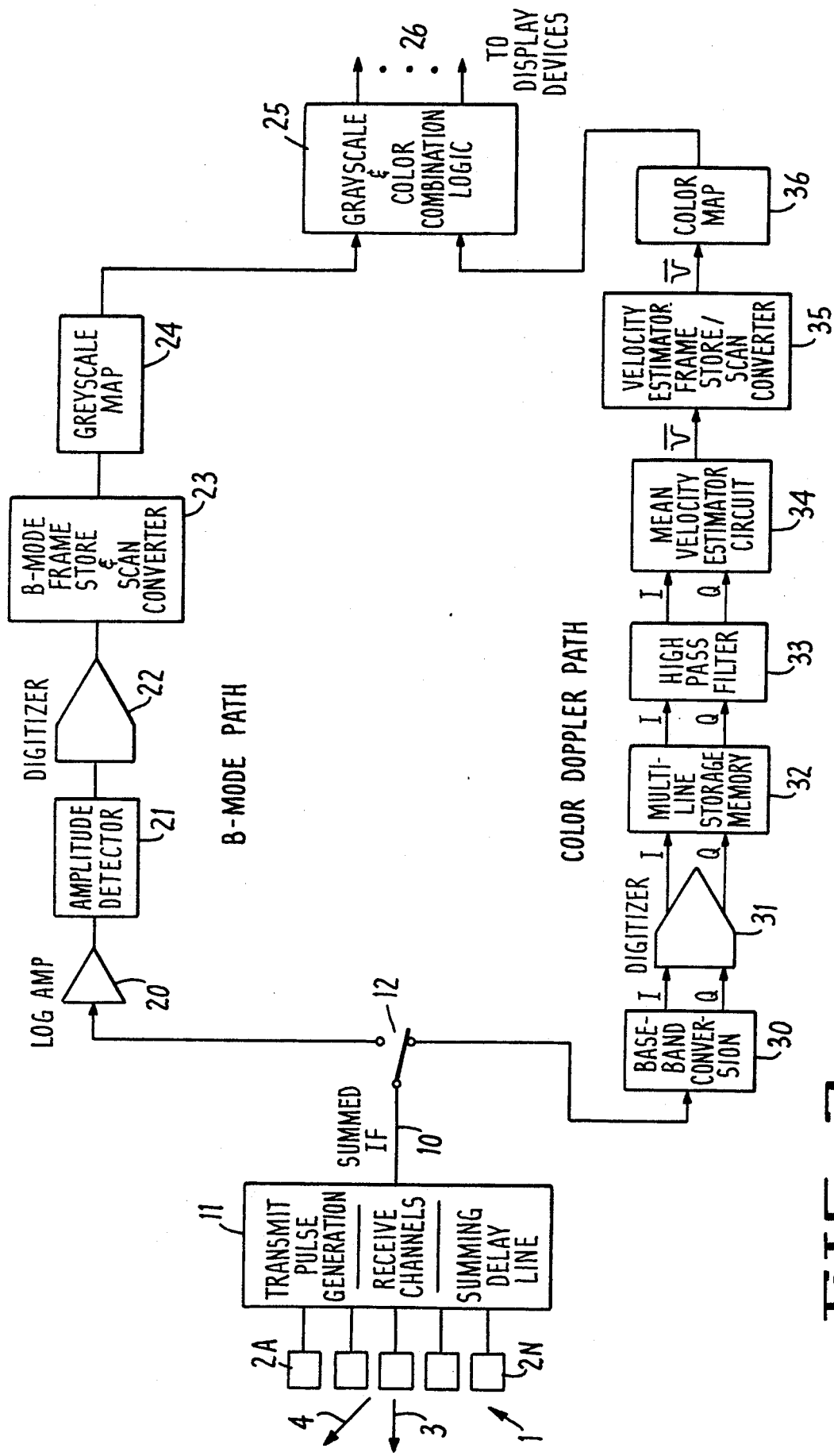
FIG. 3 is a schematic block diagram of the principal functional elements of the invention.

FIG. 1 schematically illustrates a linear array of transducer elements 2A-2N which, when activated in one mode, propagate an acoustic imaging beam 3 usually in a direction perpendicular to the linear array 1, as shown. The acoustic imaging beam shape and other characteristics are optimized for B-scan imaging. In a second mode, the transducers in timed sequence propagate an acoustic Doppler beam 4 at a preselected angle with respect to the imaging beam that is optimized to obtain Doppler-shifted data from moving scatterers such as the red blood corpuscles to form a color-encoded blood flow image superimposed on the B-scan image. The Doppler beam characteristics are also optimized for Doppler data acquisition.

For example, FIG. 2 illustrates a portion of a B-scan image of a blood vessel 5 with the image scan lines 6 propagated in a direction perpendicular to the transducer array 1 and to the blood vessel walls being examined. On the other hand, the steered Doppler beams are propagated along multiple lines 7 at an angle to the imaging beam. The direction of the Doppler beams are optimized for Doppler data acquisition from the moving scatterers in the blood flowing within the vessel 5. The Doppler beam steering direction is indicated on the display screen by a parallelogram marker 8.

Since the Doppler and imaging beams are independent, each can be optimized for its particular function. For example, the B-mode acoustic imaging beam from each transducer element is usually narrow for high resolution purposes, usually perpendicular to the transducer array and may be at a higher frequency than the Doppler beam. On the other hand, the Doppler beam can be steered independently to a more nearly optimum direction for data acquisition from the particular moving targets under examination, such as red blood cells. The transmitted frequency of the Doppler beam may be lower to reduce attenuation effects at depth. The pulse repetition rate will be linked to the velocity scale desired and may be different than for the B-mode image. In addition, the Doppler beam may have a different number of transmitted pulses, different active transmit and receive apertures and different transmit and receive apodization than the B-mode beam. The B-mode and Doppler image frame rates are faster than one new frame every five seconds.

As illustrated schematically in the block diagram of FIG. 3, the B-mode acoustic imaging beam 3 and acoustic Doppler beams 4 may be generated by the several transducer elements 2A-2N of the linear array 1, steered and timed in accord with the system shown in U.S. Pat. No. 4,550,607 issued to Samuel H. Maslak and John N.

Wright on Nov. 5, 1985 or U.S. Pat. No. 4,699,009 issued to Samuel H. Maslak and Hugh G. Larsen on Oct. 13, 1987, for example.

Transmit pulses are supplied to transducers 2A-2N in the linear array 1 to produce the acoustic imaging beam 3 usually propagated perpendicularly to the array. Imaging echoes reflected from tissue interfaces and scatterers in the organism are received by transducers 2A-2N and in a separate receive channel for each transducer are processed, delayed and combined into an intermediate frequency signal at 10 in accord with the system illustrated in U.S. Pat. No. 4,550,607, shown schematically in functional block diagram 11.

The image signals are switched at 12 to a B-mode processing path, then amplitude detected at logarithmic amplifier 20 and amplitude detector 21, converted from analog to digital signals at digitizer 22 and stored in the B-mode frame memory 23 for subsequent display of an image of the organ or other part of the body being examined in a two-dimensional gray-scale image on the video display monitor at 26. The gray-scale image is formed by encoding the B-mode echo intensities using a first mapping function of the red, green and blue components.

Separate transmit pulses are supplied in timed sequence to the array for propagation of the acoustic Doppler beams 4 at a preselected angle relative to the acoustic imaging beam. The transducers 2A-2N in timed sequence receive acoustic echoes from the Doppler beams 4 reflected from moving scatterers such as the red cells in the bloodstream. They are processed through the same separate receive channels and summing delay line at 11 into an intermediate frequency signal at 10 which is switched at 12 into a color Doppler processing path.

The Doppler signals are converted from analog to digital signals at baseband converter 30 and digitizer 31. Several Doppler information signals from each of multiple sample volumes along the direction of each Doppler beam are stored in Doppler multi-line storage memory 32. The Doppler beam is propagated many times, usually 6 to 10 times, at each line.

The several stored Doppler information signals for each sample are passed through a high-pass filter 33 which eliminates the static B-mode information. The mean velocity for each sample is determined in velocity estimator 34 and then stored in Doppler frame memory 35. The velocity estimator will typically include fast Fourier transform or autocorrelation circuitry and, typically, will compute other blood flow parameters including variance and power, as well.

The stored information for each flow frame is then encoded with a color lookup table in color map 36 for the red, green and blue components. For example, the stored information may be encoded with various intensities of red related to blood flow velocity in one direction and various intensities of blue corresponding to blood flow velocity in the opposite direction. The color output for multiple Doppler lines is combined in logic circuit 25 with the B-mode image signals that are gray-scale encoded at gray-scale map 24. The color output is displayed on video display monitor 26 as a two-dimensional color image superimposed on the gray-scale B-mode image to show blood flow direction and velocity within the blood vessel 5 of FIG. 2 in the two-dimensional area where the Doppler lines 7 intercept the vessel interior.

The acquisition of multiple lines of Doppler data may be time interleaved to utilize dead time in order to lower the color velocity scale (i.e. decrease the color Doppler repetition frequency) without lowering the frame rate. The interleaving of Doppler lines is schematically illustrated in FIG. 4 where the array 1 is activated to propagate a first acoustic Doppler beam K at 40, followed by a second acoustic Doppler beam K+1 at 41, followed by a third acoustic Doppler beam K+2 at 42, etc., for N independently propagated acoustic Doppler beams. In the example, the beams are propagated at the same angle to gather Doppler-shifted information from multiple sample volumes along the direction of each beam and over an extended area of the image as defined by the beams. The Doppler lines could also be steered at an angle different than shown.

The activation sequence of transducer elements 2A-2N illustrated in FIG. 5 is such that each line 40,41,42, etc., is activated multiple times with a precisely generated period T between each firing of the same line with corresponding precise processing of the acoustic echoes from that beam. The 40, 41,42 . . . N independent lines of Doppler-shifted information are collected in sequence within each repetition of period T. In this manner, the independent acoustic Doppler lines are interleaved with the acquisition occurring precisely and periodically with a period of T seconds between acquisition on each line but with N divided by T acoustic lines propagated and processed per second where N is the number of independent acoustic lines. As described earlier, several Doppler signals from each of the multiple sample volumes are stored for each line so that Doppler-shifted blood flow information can be obtained for each sample volume.

As illustrated in U.S. Pat. No. 4,550,607, means to dynamically focus and dynamically apodize the acoustic information received in echoes from the individual Doppler beams may be employed as there described for acoustic imaging and Doppler-shifted information. Also, the imaging and Doppler data may be propagated and collected at two different frequencies. Other variations may be apparent to those familiar with this art within the scope of the invention defined by the following claims.

We claim:

1. A dual mode ultrasound imaging system having an array of acoustic transducer elements, said array being a single linear array and comprising B-mode imaging means to produce an electronically scanned acoustic image of an organism under examination, said B-mode image substantially representing the intensity of echoes returned from said organism along multiple B-mode scan lines and being comprised of intensity data acquired by the array along parallel scan lines directed at a first angle to a line perpendicular to the transducer array race;

Doppler imaging means to produce an electronically scanned Doppler image of said organism, said Doppler image representing estimates of velocity or variance of moving scatterers derived from Doppler-shifted echoes from said moving scatterers in said organism from multiple sample volumes acquired along the direction of multiple independently propagated Doppler scan lines with said Doppler scan lines directed at a preselected angle with respect to (end-para Doppler) said B-mode scan lines and being comprised of Doppler data acquired by the array along parallel scan lines directed at a second angle to said perpendicular line that is selectably different from said first angle; and a color display monitor displaying the B-mode image as a two dimensional image with echo intensities encoded using a first mapping function and simultaneously displaying the Doppler image as a two-dimensional image using a second and distinct mapping of red, green and blue components that is spatially coordinated with and superimposed upon said B-mode image.

2. The dual mode ultrasound imaging system of claim 1 wherein
both the B-mode and Doppler images have frame rates faster than one new frame every 5 seconds.

3. The dual mode ultrasound imaging system of claim 1 wherein
the said B-mode imaging means including means for mapping B-mode echo intensities into a substantially gray-scale image and aid Doppler imaging means including means for mapping the Doppler image estimates of velocity or variance into a substantially color-encoded image.

4. The dual mode ultrasound imaging system of claim 1 wherein the multiple lines of Doppler information are acquired in interleaved fashion with each line propagated and received with a period T between acquisition with N independent lines of Doppler-shifted information collected within each period T.

5. The dual mode ultrasound imaging system of claim 4 wherein the Doppler scan lines selectively may be directed at the same angle as are the B-mode scan lines.

6. The dual mode ultrasound imaging system of claim 1 wherein said first mapping function for B-mode comprises red, green and blue components.

7. A dual mode ultrasound imaging system including a linear array of acoustic transducer elements;

transmit means connected to each transducer element to generate and transmit a B-mode acoustic imaging beam in one direction into an organism under examination along multiple parallel image lines with their origins translated along the array;

receive means connected to each transducer element to receive acoustic imaging echoes returned from said organism, to process said echoes into an electrical signal and to combine signals from multiple transducer elements of the array into a summed and intensity-detected B-mode image signal representing an image of tissue interfaces and scatterers in said organism;

frame memory means for storing the detected B-mode image signals for each image line;

transmit means connected to each transducer element to generate and transmit an acoustic Doppler beam into said organism at a preselected angle with respect to said acoustic imaging beam multiple times along each of multiple parallel Doppler lines with their origins translated along the array;

receive means connected to each transducer element to receive Doppler-shifted echoes from moving scatterers in said organism from multiple sample volumes along the direction of each of said Doppler lines and to process them into digital Doppler information signals;

means for extracting from the digital Doppler information signals at least one estimate of the velocity or variance of the moving scatterers in each sample volume;

frame memory means for storing the estimates of velocity or variance information for each Doppler line; and means for displaying the B-mode image line signals as a two-dimensional image with echo intensity encoded as a gray-scale and for simultaneously displaying the estimates of velocity or variance information as a two-dimensional color-encoded image that is spatially coordinated with and superimposed upon said gray-scale image.

8. The two-dimensional Doppler ultrasound imaging system of claim 5 wherein said receive means for Doppler-shifted echoes acquires multiple lines of Doppler information in interleaved fashion with each line propagated and received with a period T between acquisition with N independent lines of Doppler-shifted information collected within each period T.

9. The dual mode ultrasound imaging system of claim 5 further comprising a marker indicating the direction of the parallel Doppler lines.

10. A method of forming a steered linear color doppler acoustic image by transmitting acoustic pressure waves and receiving returned echoes on acoustic lines scanned along a transducer array, said method comprising the steps of driving a B-mode image from echoes received along a first set of parallel scan lines in a first direction with respect to the transducer array, acquiring color Doppler information from multiple volumes along a second set of independently propagated parallel scan lines in a selectable direction which may be different from said first direction and displaying said color Doppler information as a two-dimensional color coded image that is spatially coordinated with and superimposed upon said B-mode image.

11. The color Doppler acoustic imaging method of claim 10 wherein the Doppler information represents estimates of velocity or variance of moving scatterers derived from Doppler-shifted echoes from said moving scatterers.

12. The color Doppler acoustic imaging method of claim 10 further comprising the step of a steering the set of Doppler scan lines in a direction that is not normal to the transducer array.

13. The color Doppler acoustic imaging method of claim 10 further comprising the step of transmitting the acoustic pressure waves for acquisition of Doppler information at a frequency which differs from the frequency of the acoustic pressure waves transmitted for B-mode information.

14. The color Doppler acoustic imaging method of claim 10 further comprising the step of providing a marker indicating the Doppler beam steering direction.

* * * * *

UNITED STATES PATENT OFFICE
CERTIFICATE OF CORRECTION

Patent No. 5,014,710                Dated May 14, 1991

Inventor(s) Samuel H. Maslak, et al.

It is certified that error appears in the above-identified patent and that said Letters Patent is hereby corrected as shown below:

Claim 1:

Col. 4, line 57, "race" should be --- face ---

Col. 4, line 67, delete "(end-para Doppler)"

Claim 3:

Col. 5, line 20, "aid" should be --- said ---

Claim 12:

Col. 6, line 48, delete "a" before "steering"

Signed and Sealed this

Sixteenth Day of March, 1993

*Attest:*

STEPHEN G. KUNIN

*Attesting Officer*   *Acting Commissioner of Patents and Trademarks*